(12) United States Patent
Grouillet et al.

(10) Patent No.: US 11,691,477 B2
(45) Date of Patent: Jul. 4, 2023

(54) VORTEX SEPARATION DEVICE FOR A FLUID TRANSFER CIRCUIT

(71) Applicant: HUTCHINSON, Paris (FR)

(72) Inventors: Philippe Grouillet, Conflans sur Loing (FR); Bastien Rouprich, Noyers (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 17/446,077

(22) Filed: Aug. 26, 2021

(65) Prior Publication Data

US 2022/0063373 A1  Mar. 3, 2022

(30) Foreign Application Priority Data

Aug. 28, 2020 (FR) ..................................... 2008788

(51) Int. Cl.

| B04C 5/04 | (2006.01) |
|---|---|
| B60H 1/03 | (2006.01) |
| B04C 5/103 | (2006.01) |
| F01P 11/02 | (2006.01) |
| F01P 11/04 | (2006.01) |

(52) U.S. Cl.
CPC ............... B60H 1/038 (2013.01); B04C 5/04 (2013.01); B04C 5/103 (2013.01); F01P 11/028 (2013.01); F01P 11/029 (2013.01); F01P 11/04 (2013.01)

(58) Field of Classification Search
CPC ........... B60H 1/038; B04C 5/04; B04C 5/103; B04C 5/13; B04C 5/14; B04C 5/28; F01P 11/028; F01P 11/029; F01P 11/04; B01D 19/0042; B01D 19/0057

See application file for complete search history.

(56) References Cited

U.S. PATENT DOCUMENTS

| 3,049,343 A | * | 8/1962 | Helming | ................. C04B 7/432 |
|---|---|---|---|---|
| | | | | 55/444 |
| 3,146,998 A | * | 9/1964 | Golucke | ............... F27B 7/2025 |
| | | | | 432/16 |
| 3,969,096 A | * | 7/1976 | Richard | .................. F01N 3/037 |
| | | | | 55/455 |

(Continued)

FOREIGN PATENT DOCUMENTS

| CA | 2222597 C | * | 7/2007 | ............ B01J 8/0055 |
|---|---|---|---|---|
| CN | 105903580 A | * | 8/2016 | |

(Continued)

*Primary Examiner* — Dung H Bui
(74) *Attorney, Agent, or Firm* — Browdy and Neimark, P.L.L.C.

(57) ABSTRACT

The invention relates to a vortex degassing device (1) for a fluid transfer circuit (F1, F2), in particular of a motor vehicle, this device (1) comprising:
a first internal chamber (10) connected to a first inlet (11) for a fluid (F1) as well as to a first outlet (12) for a liquid fraction and to a second outlet (13) for a gaseous fraction,
a second internal chamber (20) connected to a second inlet (21) for a fluid (F2) as well as to a third outlet (22) for a liquid fraction and to a fourth outlet (23) for a gaseous fraction,
the second chamber (20) being located above the first chamber (10) and the second outlet (13) extending through the second chamber (20) to the level of the fourth outlet (23). The invention also relates to a fluid transfer circuit comprising at least one such device (1) as well as a method for using such a device (1).

23 Claims, 7 Drawing Sheets

(56) References Cited

U.S. PATENT DOCUMENTS

| | | | | |
|---|---|---|---|---|
| 4,211,641 A * | 7/1980 | Jager | ............... | B07B 7/086 |
| | | | | 209/714 |
| 4,271,010 A * | 6/1981 | Guarascio | ............ | B04C 5/04 |
| | | | | 210/512.2 |
| 4,783,254 A * | 11/1988 | Shah | ............ | B03B 5/34 |
| | | | | 209/724 |
| 6,193,075 B1 * | 2/2001 | Plas | ............ | B07B 7/083 |
| | | | | 209/714 |
| 6,746,500 B1 * | 6/2004 | Park | ............ | A47L 9/1683 |
| | | | | 55/459.1 |
| 7,014,671 B2 * | 3/2006 | Oh | ............ | A47L 9/1625 |
| | | | | 55/459.1 |
| 7,390,339 B1 * | 6/2008 | Warrick | ............ | B04C 5/13 |
| | | | | 96/417 |
| 8,690,979 B2 * | 4/2014 | Nagasawa | ............ | B04C 5/26 |
| | | | | 55/467 |
| 9,289,782 B2 * | 3/2016 | Hajash | ............ | B01D 45/16 |
| 10,758,843 B2 * | 9/2020 | Mendez | ............ | H01M 10/613 |
| 11,002,645 B2 * | 5/2021 | Wiederin | ............ | G01N 1/2211 |
| 11,007,541 B2 * | 5/2021 | Chen | ............ | B01D 45/12 |
| 11,338,232 B2 * | 5/2022 | Schafrik | ............ | B01D 45/16 |
| 2003/0172632 A1 * | 9/2003 | Matsubara | ............ | F01M 13/04 |
| | | | | 55/459.1 |
| 2010/0213118 A1 * | 8/2010 | Tandon | ............ | B04C 5/14 |
| | | | | 210/512.2 |
| 2018/0238619 A1 * | 8/2018 | Baxter | ............ | F25J 3/0635 |
| 2019/0321756 A1 * | 10/2019 | Kompala | ............ | B01J 8/0055 |

FOREIGN PATENT DOCUMENTS

| | | | | |
|---|---|---|---|---|
| DE | 841977 C | 6/1952 | | |
| DE | 102004019154 A1 * | 11/2005 | ............ | B01D 45/12 |
| EP | 0726386 A1 | 8/1996 | | |
| FR | 3082441 A3 | 12/2019 | | |
| GB | 2080706 A * | 2/1982 | ............ | B04C 5/04 |
| WO | 2004001204 A1 | 12/2003 | | |

* cited by examiner

VORTEX SEPARATION DEVICE FOR A FLUID TRANSFER CIRCUIT

TECHNICAL FIELD OF THE INVENTION

The present invention relates to a vortex separation device for a fluid transfer circuit, in particular of a motor vehicle, such as a motor vehicle heat transfer circuit.

BACKGROUND

Some fluids may contain gas bubbles. This is in particular the case for the heat transfer fluid used in a heat transfer circuit of a motor vehicle, which comprises a mixture of water and glycol and may comprise air or steam bubbles.

It is preferable to separate these gas bubbles from the fluid in order to optimize the performance of the circuit, and it is known to use a vortex separation device for this.

Such a device comprises an internal chamber connected to a fluid inlet and to two outlets, respectively of a liquid fraction and a gaseous fraction of the fluid. The device is configured so that the fluid arriving through the inlet is rotated around an axis A in the chamber to form a vortex for separating liquid and gaseous fractions. The centrifugal effect of the vortex allows to separate the liquid fraction radially outwards (with respect to the axis A) and the gaseous fraction radially inwards by density difference. The liquid fraction is expelled from the chamber through the liquid outlet which is generally positioned at the external periphery of the chamber, and its gaseous fraction is expelled from the chamber through the gaseous outlet which is generally located at the level of the axis A.

There are also devices for double circuits, i.e. two circuits for circulating two fluids (identical or different) are connected to the same vortex separation device. However, the solutions of the prior art do not allow an optimized operation of the device, in particular for fluid flow rates higher than about 10 L/min. Furthermore, these devices do not allow for effective isolation of the two independent circuits, which can have negative consequences, in particular in terms of heat exchange between the two circuits, in particular when the latter operate at different temperatures.

In particular, the present invention is intended to solve some or all of the above problems.

SUMMARY OF THE INVENTION

The invention relates to a vortex degassing device for a fluid transfer circuit, in particular of a motor vehicle, this device comprising:
  a first internal chamber connected to a first inlet of a fluid as well as to a first outlet of a liquid fraction and to a second outlet of a gaseous fraction, the second outlet extending upwards along an axis A,
  a first deflector projecting inside the first chamber to force the fluid arriving through the first inlet to form a vortex in the first chamber around said axis A, in order to separate the liquid and gaseous fractions of this fluid, which are expelled respectively through the first and second outlets, characterized in that it further comprises:
  a second internal chamber connected to a second inlet of a fluid as well as to a third outlet of a liquid fraction and to a fourth outlet of a gaseous fraction, the fourth outlet of the gaseous fraction extending at least partly upwards along said axis A, and
  a second deflector projecting inside the second chamber to force the fluid arriving through the second inlet to form a vortex in the second chamber around said axis A, in order to separate the liquid and gaseous fractions of this fluid, which are expelled respectively through the third and fourth outlets, and in that the second chamber is located above the first chamber, the second outlet extending through the second chamber to the level of the fourth outlet.

The invention thus proposes to provide in particular the first chamber with a second outlet of a gaseous fraction that rises to the level of the fourth outlet. In particular, this arrangement allows to prevent the bubbles collected in the first chamber and discharged through the second outlet from being carried into the second chamber. This arrangement also allows to avoid the flow exchanges between the two chambers, and thus to limit the heat exchanges between the two chambers and thus between two independent sub-circuits of the circuit supplying the first and second chambers respectively. This limitation of the thermal exchanges allows in particular sub-circuits to operate at different temperatures while sharing a common separation device.

The invention also allows efficient operation at high flow rates, in particular above 10 L/min.

The device according to the invention may comprise one or more of the following characteristics, taken alone or in combination with each other:
  The first inlet and the first outlet are located at different positions along the axis A;
  The second inlet and the third outlet are located at different positions along the axis A;
  The second outlet extends along the axis A to above the second inlet;
  The second outlet comprises a free upper end which is axially spaced from the fourth outlet or surrounded by the fourth outlet;
  The device may also comprise:
    a generally cylindrical body, a lower portion of which comprises the first chamber and an upper portion of which comprises the second chamber, and
    fluidic connection end caps out projecting from the body, which form the first and second inlets and the first, third and fourth outlets respectively;
  The device can also be made from three pieces:
    a first piece forming the lower portion of the body as well as the connection end caps of the first inlet and the first outlet,
    a second piece forming the upper portion of the body as well as the connection end caps of the second inlet and of the third and fourth outlets, and
    a third piece mounted inside the body and forming the second outlet;
  The third piece is in the form of an inverted funnel and comprises an upper chimney forming the second outlet and a lower dome which is mounted in the body so as to delimit the first and second chambers, this dome comprising a central orifice aligned on the axis A and opening into said chimney;
  The dome comprises an external periphery configured to be clamped axially and/or radially between joining edges of the first and second pieces;
  The dome comprises at its external periphery at least one indexing element configured to cooperate in a form-fitting manner with a corresponding element of the first piece so as to impose a predetermined angular position around the axis A of the third piece relative to the first piece;

At least one annular seal is mounted between the external periphery of the dome and the first piece and/or between the external periphery of the dome and the second piece;

The second deflector is integrated with the second piece and/or the first deflector is integrated with the third piece;

The first deflector is connected to the dome and extends along the axis A from the inside to the outside of the dome;

The device is made of plastic material;

The second outlet has a minimum passage section S1 and the fourth outlet has a minimum passage section S2, with S1=k·S2, k being between 0.8 and 1.2 and preferably equal to 1;

The inlets each have an average internal diameter of between 8 and 32 mm, preferably between 12 and 20 mm, and for example 16 mm;

The first and third outlets each have an average internal diameter of between 8 and 32 mm, preferably between 12 and 20 mm, and for example 16 mm;

The fourth outlet has an average internal diameter of between 6 and 22 mm, preferably between 12 and 20 mm, and for example 16 mm;

The device or the body has an external diameter of between 40 and 80 mm, preferably between 50 and 60 mm, and for example of the order of 55 mm;

The device or the body has a length or height measured along the axis A, which is between 80 and 180 mm, preferably between 110 and 150 mm, and for example 130 mm;

The distance, measured along the axis A, between the upper free end of the second outlet and the second inlet is greater than or equal to 5 mm, and preferably less than or equal to 15 mm.

The invention also relates to a fluid transfer circuit, in particular of a motor vehicle, comprising at least one device as described above.

The first and second chambers are connected by means of the fourth outlet to a common surge tank, for example.

The invention further relates to a method for using a device as described above in a fluid transfer circuit, in particular of a motor vehicle, in which a same fluid, for example a heat-transfer fluid, circulates in the first and second chambers, these fluids being at the same pressure and at different temperatures.

BRIEF DESCRIPTION OF FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
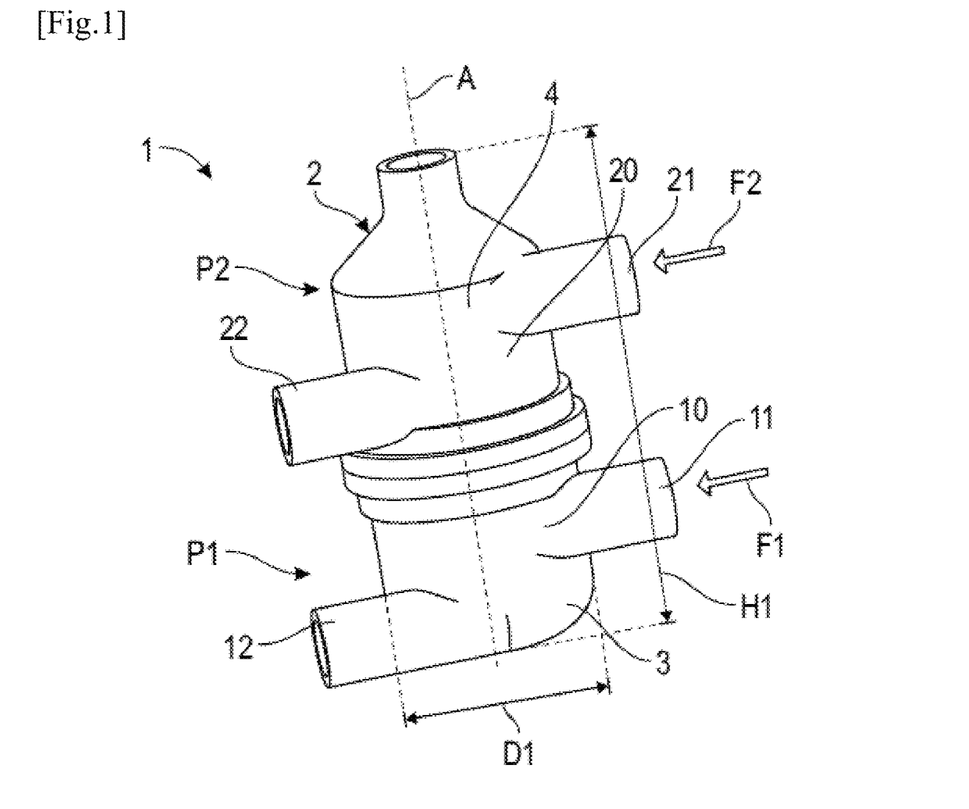
FIG. 1 shows a schematic perspective view of a separation device according to the invention.
Figure 2:
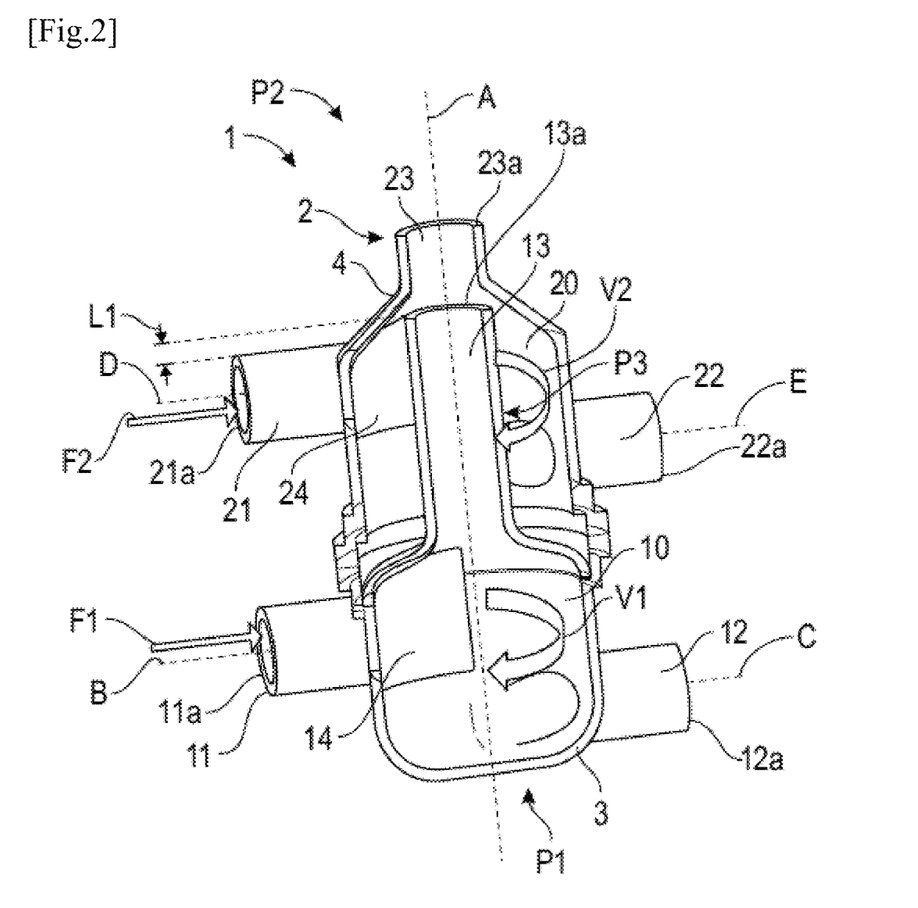
FIG. 2 shows a schematic perspective and cross-sectional view of the device.

FIGS. 1 and 2 illustrate a vortex degassing device 1 according to the invention for a transfer circuit of a first fluid F1 and of a second fluid F2, in particular heat-transfer fluids used in a motor vehicle. The circuit comprises, for example, a first sub-circuit in which the first fluid F1 circulates and a second sub-circuit in which the second fluid F2 circulates. In particular, the sub-circuits are independent of each other. The fluids F1, F2 are for example identical, and are in particular a mixture of water and glycol in a liquid state, in which air or steam bubbles circulate. The device 1 allows the separation of the liquid and gaseous fractions of the fluids F1, F2. In the present application, "gaseous fraction" means a gas that may contain liquid droplets or a gas-enriched liquid.

In particular, the device 1 is made of plastic material.

The device 1 comprises a first internal chamber 10 connected to a first inlet 11 of the first fluid F1 as well as to a first outlet 12 of a liquid fraction and to a second outlet 13 of a gaseous fraction. The second outlet 13 extends upwardly along an axis A. The first inlet 11 and the first outlet 12 are for example located at different positions along the axis A. The first inlet 11 is for example located above the first outlet 12.

The first chamber 10, the first inlet 11, the first outlet 12 and the second outlet 13 are part of the first sub-circuit.

The device 1 further comprises a second internal chamber 20. The second chamber 20 is located above the first chamber 10 along the axis A. The second internal chamber 20 is connected to a second inlet 21 of the second fluid F2 as well as to a third outlet 22 of a liquid fraction and to a fourth outlet 23 of a gaseous fraction. The fourth outlet 23 of a gaseous fraction extends at least partially upward along the axis A. The second inlet 21 and the third outlet 22 are for example located at different positions along the axis A. The second inlet 21 is for example located above the third outlet 22.

The second chamber 20, the second inlet 21, the third outlet 22 and the fourth outlet 23 are part of the second sub-circuit.

Unless otherwise specified, the adjectives inner/internal and outer/external are used in reference to a radial direction such that the inner (i.e. radially inner) part of an element is closer to the axis A than the outer (i.e. radially outer) part of the same element. Similarly, the terms above/below and upper/lower are used in reference to the position of the elements along the axis A relative to the ground.

In particular, the first and second inlets 11, 21 each have an average internal diameter of between 8 and 32 mm, preferably between 12 and 20 mm, and for example 16 mm.

In particular, the first and third outlets 12, 22 each have an average internal diameter of between 8 and 32 mm, preferably between 12 and 20 mm, and for example 16 mm.

The fourth outlet 23 has an average internal diameter of between 6 and 22 mm, preferably between 12 and 20 mm, and for example 16 mm.

The device 1 also comprises a first deflector 14 projecting into the first chamber 10. The first deflector 14 allows to guide and accelerate the first fluid F1 arriving through the first inlet 11. Thus, upon arrival through the first inlet 11, the first fluid F1 is forced to form a vortex in the first chamber 10 around the axis A, in order to separate the liquid and gaseous fractions of the first fluid F1. The liquid and gaseous fractions of the first fluid F1 are expelled through the first 12 and second 13 outlets respectively.

The device 1 also comprises a second deflector 24 projecting into the second chamber 20. The second deflector 24 allows to guide and accelerate the second fluid F2 arriving through the second inlet 21. Thus, upon arrival through the second inlet 21, the second fluid F2 is forced to form a vortex in the second chamber 20 around the axis A, in order to separate the liquid and gaseous fractions of the second fluid F2. The liquid and gaseous fractions of the second fluid F2 are expelled through the third 22 and fourth 23 outlets respectively.

The second outlet 13 extends through the second chamber 20 to the level of the fourth outlet 23. The second outlet 13 extends along the axis A in particular to above the second inlet 21. Thus, the bubbles in the lower circuit, i.e. in the first sub-circuit, are not entrained by the fluid circulating in the second chamber 20, i.e. in the second sub-circuit.

The second outlet 13 comprises a free upper end 13a which is axially spaced from the fourth outlet 23 or surrounded by the fourth outlet 23. The distance L1 measured along the axis A, between the upper free end 13a of the second outlet 13 and the second inlet 21 is greater than or equal to 5 mm, and preferably less than or equal to 15 mm. The second outlet 13 has a minimum passage cross-section S1 and the fourth outlet 23 has a minimum passage cross-section S2, with S1=k·S2, k being in particular between 0.8 and 1.2 and preferably equal to 1. Thus, the passage cross-sections S1, S2 of the bubbles in the two chambers 10, 20 are identical or very similar. The degassing and filling capacities of each of the chambers 10, 20 are then balanced.

In particular, the second outlet 13 is located in the center of the second chamber 20 so that it does not interfere with the tangential and/or peripheral flow of the second fluid F2 in the second chamber 20.

The internal shapes of the chambers, and in particular those of the deflectors 14, 24 are not necessarily identical. This allows to adapt to the particular conditions of fluid flow rate and gas quantity of each sub-circuit.

The device 1 comprises a generally cylindrical body 2 whose axis of revolution is coincident with the axis A and extends vertically here. The body 2 comprises a lower portion 3 comprising the first chamber 10. The body 2 comprises an upper portion 4 comprising the second chamber 20.

The device 1 or the body 2 has an external diameter D1, measured perpendicularly to the axis A, of between 40 and 80 mm, preferably between 50 and 60 mm, and for example of the order of 55 mm.

The device 1 or the body 2 has a length or height H1, measured along the axis A, which is between 80 and 180 mm, preferably between 110 and 150 mm, and for example 130 mm.

The device 1 also comprises fluidic connection end caps 11a, 21a, 12a, 22a, 23a projecting from the body 2 which form the first 11 and second 21 inlets, as well as the first 12, third 22 and fourth 23 outlets respectively.

The end cap 11a corresponds to the first inlet 11. Here it extends along an axis B. The axis B lies in a plane perpendicular to the axis A. This axis B is oriented tangentially to a circumference centered on the axis A.

The end cap 21a corresponds to the second inlet 21. Here it extends along an axis D. The axis D lies in a plane perpendicular to the axis A. This axis D is oriented tangentially to a circumference centered on the axis A.

The end cap 12a corresponds to the first outlet 12. Here it extends along an axis C. The axis C lies in a plane perpendicular to the axis A. This axis C is oriented tangentially to a circumference centered on the axis A. The end cap 12a is located here below the end cap 11a along the axis A.

The end cap 22a corresponds to the third outlet 22. Here it extends along an axis E. The axis E lies in a plane perpendicular to the axis A. This axis E is oriented tangentially to a circumference centered on the axis A. The end cap 22a is located here below the end cap 21a along the axis A.

The axes B, C, D, E are here in the same plane, in particular parallel to the axis A, but could be arranged in different planes.

The tangential position of the first and second inlets 11, 21, allows to reinforce the vortex effect of the device 1. Similarly, the tangential position of the first and third outlets 12, 22, allows to reinforce the vortex effect of the device 1. The first and second inlets 11, 21, as well as the first and third outlets 12, 22 may be located in a relative orientation different from the embodiment illustrated in FIGS. 1 and 2, while remaining positioned tangentially to the chambers 10, 20, so as to be able to adapt to the architecture of the circuit in which the device 1 will be mounted.

Thus, in the present invention, the inlets of the fluid to each chamber are optimized (vertically and horizontally) to reinforce the vortex effect for the two sub-circuits and the two chambers have been superimposed. Each chamber is thus similar to an optimized single flow system.

As shown in FIGS. 3, 4a, 4b, 5a, 5b, 6a, 6b, the device 1 is in particular made from three pieces P1, P2, P3.

Figure 3:
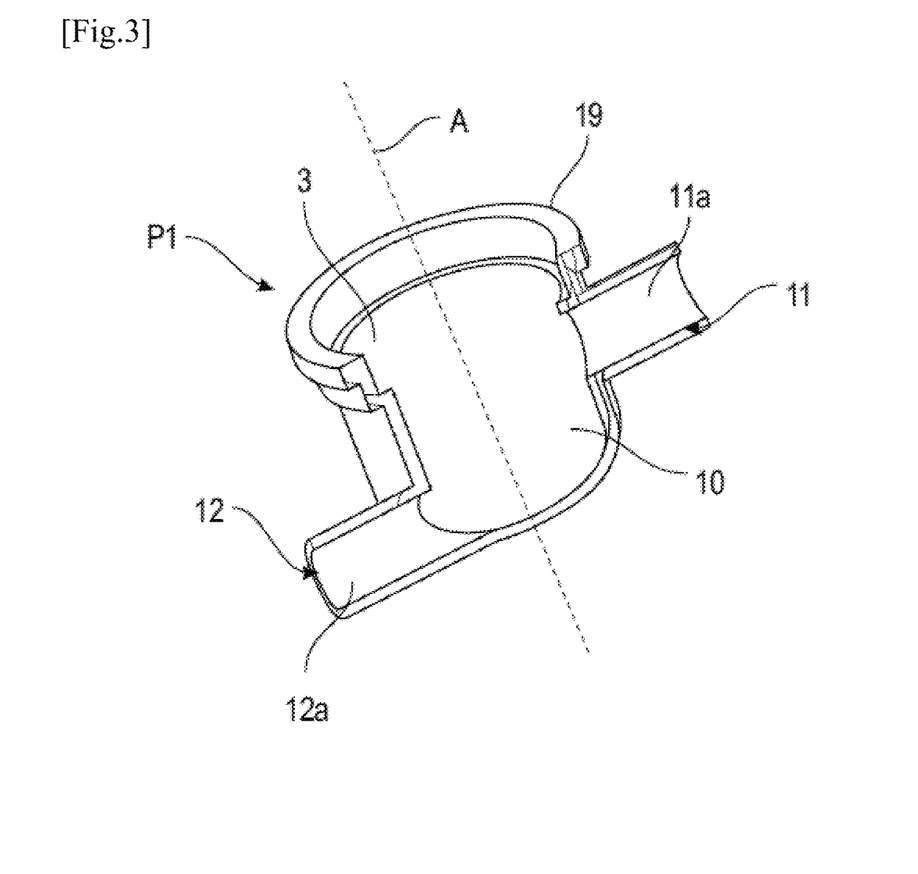
FIG. 3 shows a schematic perspective and cross-sectional view of a first piece of the device.

As shown in FIG. 3, a first piece P1 forms the lower portion 3 of the body 2 as well as the connecting end caps 11a, 12a forming the first inlet 11 and the first outlet 12.

Figure 4A:
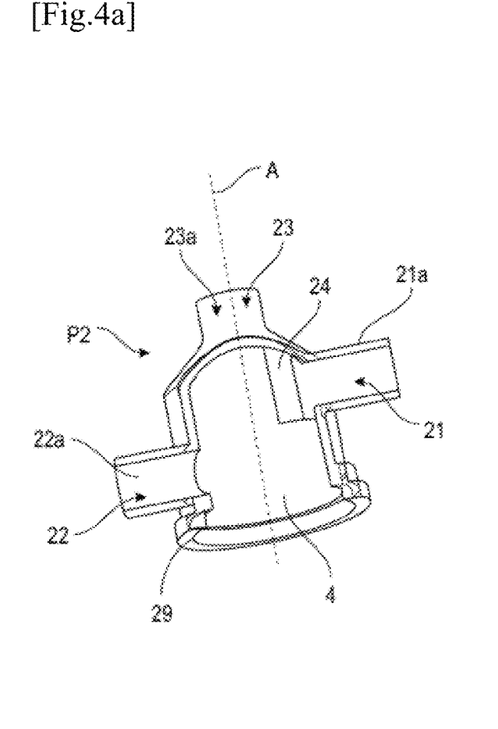
FIGS. 4a and 4b show a schematic perspective and cross-sectional view of a second piece of the device.
Figure 4B:
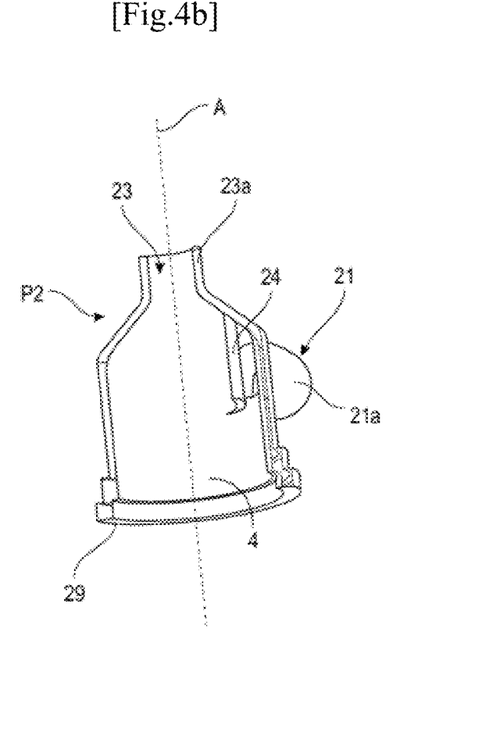

As shown in FIGS. 4a and 4b, a second piece P2 forms the upper portion 4 of the body 2 as well as the connecting end caps 21a, 22a, 23a forming the second inlet 21 and the third 22 and fourth outlet 23. The second deflector 24 is in particular integrated into the second piece P2.

Figure 5A:
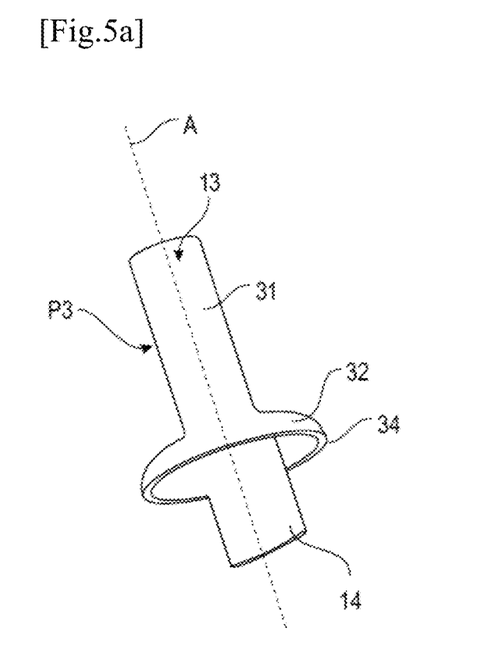
FIGS. 5a and 5b show a schematic perspective and bottom view respectively of a third piece of the device.
Figure 5B:
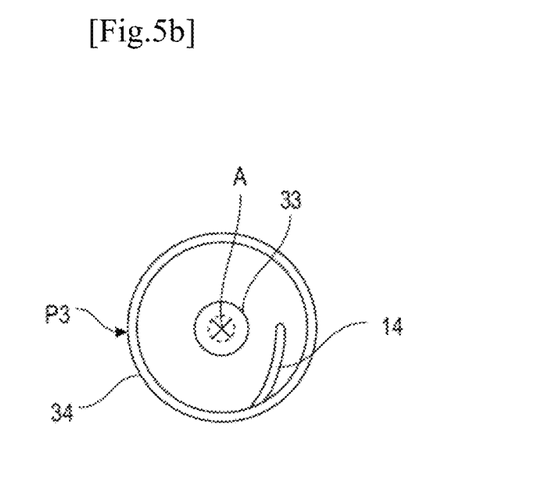

As shown in FIGS. 5a and 5b, a third piece P3 mounted within the body 2 forms the second outlet 13.

The third piece P3 is in the form of an inverted funnel. The third piece P3 comprises an upper chimney 31 forming the second outlet 13. The third piece P3 also comprises a lower dome 32.

The lower dome 32 is mounted in the body 2 so as to delimit the first and second chambers (not shown in FIGS. 5a and 5b). This dome 32 comprises a central orifice 33 aligned with the axis A and opening into the chimney 31. The dome 32 comprises an external periphery 34 configured to be clamped axially and/or radially between joining edges of the first P1 and second P2 pieces (referenced 19 in FIGS. 3 and 29 in FIGS. 4a and 4b respectively). The dome 32, and in particular its clamping between the joining edges of the first and second pieces, thus allows the first and second chambers to be separated in a sealed manner.

The first deflector 14 is for example integrated into the third piece P3. In particular, the first deflector 14 is connected to the dome 32 and extends along the axis A from the inside to the outside of the dome 32.

Thanks to the invention, a single piece (the third piece P3) separates the two internal volumes of the two chambers and ensures the guidance of the bubbles captured in the first chamber.

Figure 6A:
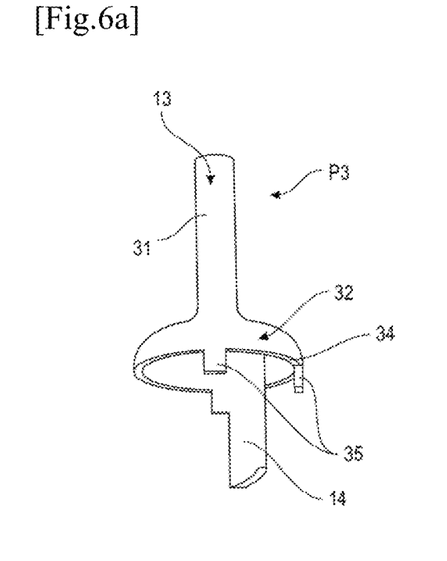
FIGS. 6a and 6b show a schematic perspective view of the third piece and of the first piece respectively.
Figure 6B:
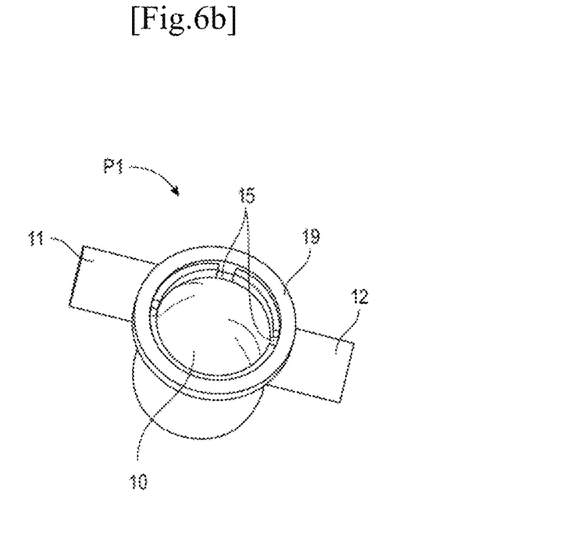

As illustrated in FIGS. 6a and 6b, the dome 32 comprises, for example, at its external periphery 34 at least one indexing element 35. This indexing element 35 is configured to cooperate in a form-fit manner with a corresponding element 15 of the first piece P1 so as to impose a predetermined angular position around the axis A of the third piece P3 with respect to the first piece P1. In particular, this allows to ensure that the first deflector 14 (when carried by the third piece P3) is correctly positioned with respect to the first inlet 11 of the first piece P1. The device 1 comprises here two indexing elements 35 which are in particular two lugs. The device 1 comprises here two corresponding elements 15 of the first piece P1 which are in particular two ribs, complementary in shape to the lugs so as to allow the indexing of the third piece P3 on the first piece P1 around the axis A.

Thus, the first fluid F1 enters the chamber 10 through the inlet 11 and is then set in rotation due to in particular the tangential position of this first inlet 11. The first fluid F1 thus undergoes a rotational movement and is further guided and accelerated by the first deflector 14. The first fluid F1 rotates and flows from top to bottom in the first chamber 10 forming the vortex along a direction referenced V1 in FIG. 2. During this rotation, the heavier liquid fraction separates from the lighter gaseous fraction by centrifugal effect. The liquid fraction flows through the first tangentially oriented outlet 12, and the gaseous fraction rises in the chimney 31 through the orifice 33 of the dome 32 along the axis A and is discharged through the second outlet 13. This allows to prevent the bubbles collected in the first chamber 10 from being drawn into the chamber 20. The small diameter of the chimney 31 allows to limit the disturbance of the operation of the second chamber 20.

Also, the second fluid F2 enters the second chamber 20 through the second inlet 21 and is then set in rotation due to the tangential position of this second inlet 21. The second fluid F2 thus undergoes a rotational movement and is further guided and accelerated by the second deflector 24. The second fluid F2 rotates and circulates from top to bottom in the second chamber 20 forming the vortex along a direction referenced V2 in FIG. 2. During this rotation, the heavier liquid fraction separates from the lighter gaseous fraction by centrifugal effect. The liquid fraction flows through the third tangentially oriented outlet 22, and the gaseous fraction rises along the axis A and is discharged through the fourth outlet 23.

Figure 7:
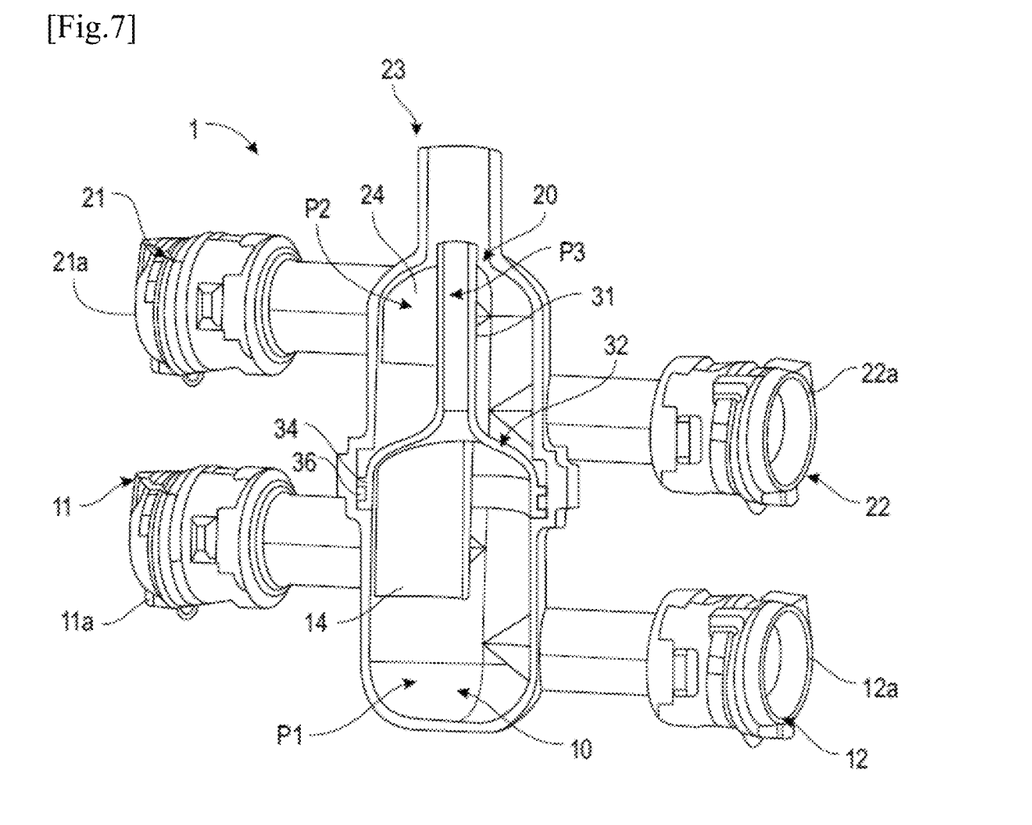
FIG. 7 shows a schematic perspective and cross-sectional view of the device.

As shown in FIG. 7, at least one annular seal 36 may be mounted between the external periphery 34 of the dome 32 and the first piece P1 and/or between the external periphery 34 of the dome 32 and the second piece P2. The annular seal 36 allows exchanges between the two chambers 10, 20 and therefore between the two sub-circuits to be limited to a minimum.

Figure 8A:
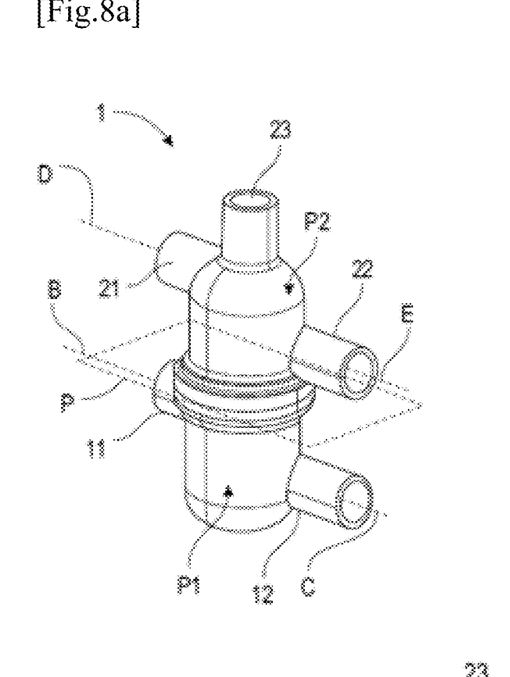
FIGS. 8a, 8b, 8c show a schematic perspective view of different variants of the device.
Figure 8B:
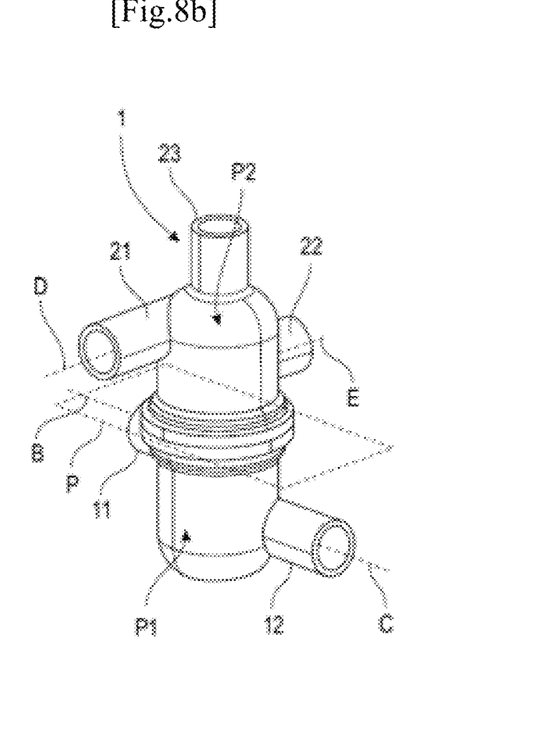
Figure 8C:
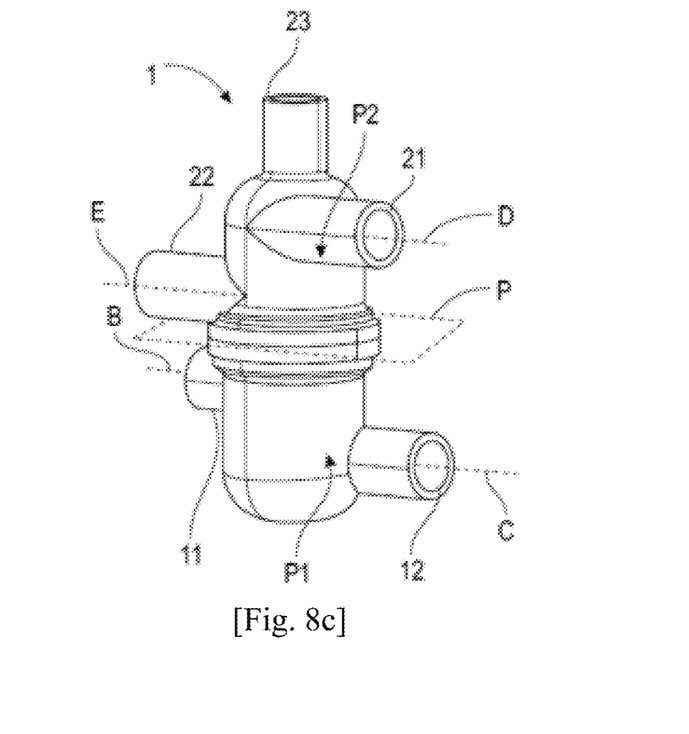

As illustrated in FIGS. 8a, 8b, 8c the circular joining edges of the first and second pieces P1, P2 may have a coplanar connection that extends along a plane P. The circular joining edges of the first piece P1 are configured to position against the circular edges of the second piece P2 along the plane P. The circular joining edges of the two pieces P1, P2, having a coplanar connection, it is possible to propose different variants of angular orientations of the first piece P1 with respect to the second piece P2 around the axis A in order in particular to adapt as well as possible to the circuits in which the device 1 is going to be positioned.

Furthermore, these different configurations of the device 1 can be realized with a single tooling for molding the pieces P1, P2. It can be seen that in all the illustrated embodiments, the first and second inlets 11, 21 and the first and third outlets 21, 22 are always positioned tangentially. Furthermore, the first inlet 11 is always located above the first outlet 12, and the second inlet 21 is always located above the third outlet 22. Other configurations of the first and second inlets 11, 21 as well as the first and third outlets 21, 22 are of course possible without departing from the scope of the invention.

Figure 9A:
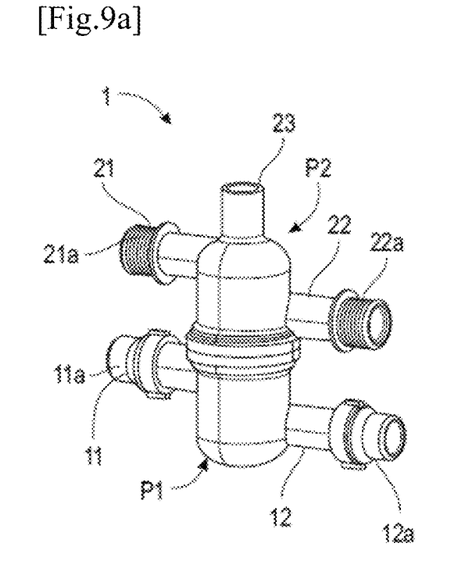
FIGS. 9a and 9b show a schematic perspective view of alternative end caps of the device.
Figure 9B:
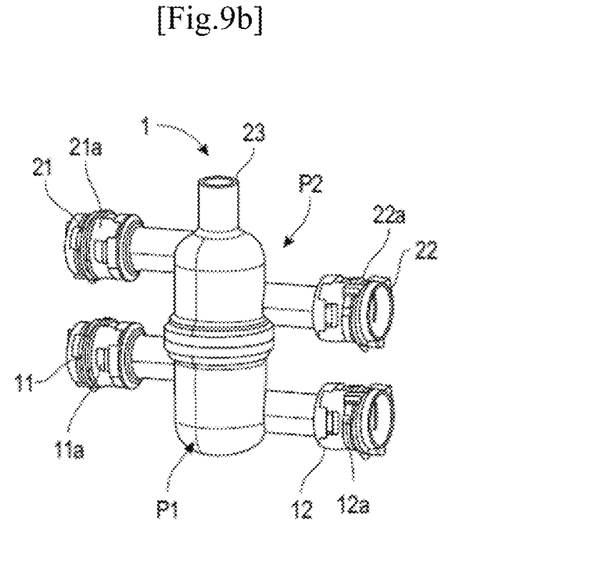

FIGS. 9a, 9b show alternative embodiments of the invention in which the end caps 11a, 12a, 21a, 22a, i.e. the types of connections, are of different types. They comprise, for example, a thread, or a snap-in system or any other type of means for connecting to a fluid circuit. In FIG. 9a, the end caps 21a and 22a comprise a thread, for example, while the end caps 11a and 12a comprise another type of connection means. In FIG. 9b, the four end caps 11a, 12a, 21a, 22a comprise a snap-in system. This allows the connection type of each end cap to be selected independently of the other end caps.

Figure 10:
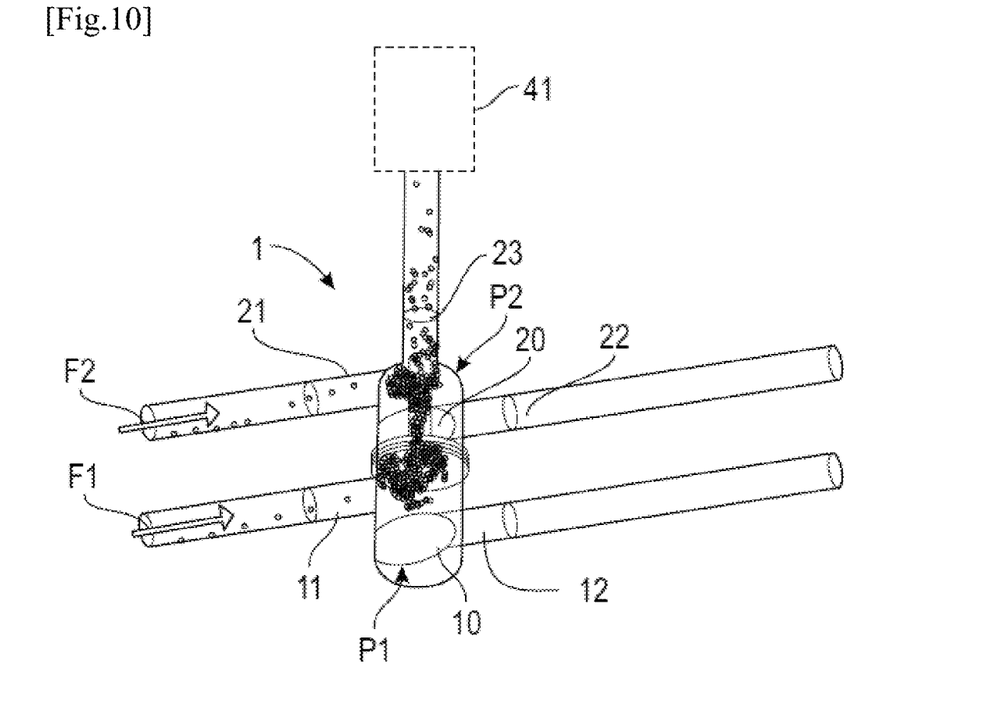
FIG. 10 shows the device connected to a common surge tank.

As shown in FIG. 10, the invention also relates to a fluid transfer circuit F1, F2, in particular of a motor vehicle, comprising at least one device 1 as previously described. The first 10 and second 20 chambers of the circuit are connected by means of the fourth outlet 23 to a common surge tank 41 of the fluid transfer circuit.

The invention further relates to a method for using a device 1 as described above in a fluid transfer circuit F1, F2, in particular of a motor vehicle, in which the same fluid F1, F2, for example heat-transfer fluid, circulates in the first 10 and second 20 chambers. These fluids F1, F2 are at the same pressure and at different temperatures.

The invention can be applied to any type of fluid that may comprise gas bubbles. It is preferably developed in the case of a thermal control circuit of a motor vehicle.

The invention can in particular be used in the automotive sector in the broad sense (truck, bus, public works machines, agricultural machines, etc.), on all vehicles equipped with a fluid transfer circuit, such as a heat transfer circuit, and this regardless of their propulsion mode (combustion engine, electric motor, hybrid engine, etc.).

The invention claimed is:

1. A vortex degassing device for a fluid transfer circuit, the device comprising:
  a first internal chamber connected to a first inlet of a fluid as well as to a first tangentially oriented outlet of a liquid fraction and to a second outlet of a gaseous fraction, the second outlet extending upwards along an axis A,
  a first deflector projecting inside the first chamber to force the fluid arriving through the first inlet to form a vortex in the first chamber around said axis A, in order to separate the liquid and gaseous fractions of this fluid, which are expelled respectively through the first and second outlets,
  wherein the vortex degassing device further comprises:
  a second internal chamber connected to a second inlet of a fluid as well as to a third tangentially oriented outlet of a liquid fraction and to a fourth outlet of a gaseous fraction, the fourth outlet of the gaseous fraction extending at least partly upwards along said axis A, and
  a second deflector projecting inside the second chamber to force the fluid arriving through the second inlet to form a vortex in the second chamber around said axis A, in order to separate the liquid and gaseous fractions of this fluid, which are expelled respectively through the third and fourth outlets, and in that the second chamber is located above the first chamber, the second outlet extending along said axis A through the second chamber and up to the level of the fourth outlet.

2. The vortex degassing device according to claim 1, wherein the first inlet and the first outlet are located at different positions along the axis A.

3. The vortex degassing device according to claim 1, wherein the second inlet and the third outlet are located at different positions along the axis A.

4. The vortex degassing device according to claim 1, wherein the second outlet extends along the axis A to above the second inlet.

5. The vortex degassing device according to claim 1, wherein the second outlet comprises a free upper end which is axially spaced from the fourth outlet or surrounded by the fourth outlet.

6. The vortex degassing device according to claim 1, it which comprises:
  a cylindrical body, a lower portion of which comprises the first chamber and an upper portion of which comprises the second chamber, and
  fluidic connection end caps projecting from the body, which form the first and second inlets and the first, third and fourth outlets respectively.

7. The vortex degassing device according to claim 6, which is made from three pieces:
  a first piece forming the lower portion of the body as well as the connection end caps of the first inlet and of the first outlet,
  a second piece forming the upper portion of the body as well as the connection end caps of the second inlet and of the third and fourth outlet, and
  a third piece mounted inside the body and forming the second outlet.

8. The vortex degassing device according to claim 7, wherein the third piece is in the form of an inverted funnel and comprises an upper chimney forming the second outlet and a lower dome which is mounted in the body so as to delimit the first and second chambers, the lower dome comprising a central orifice aligned on the axis A and opening into said chimney.

9. The vortex degassing device according to claim 8, wherein the lower dome comprises an external periphery configured to be clamped axially and/or radially between joining edges of the first and second piece.

10. The vortex degassing device according to claim 8, wherein the lower dome comprises at an external periphery of the lower dome at least one indexing element configured to cooperate in a form-fitting manner with a corresponding element of the first piece so as to impose a predetermined angular position around the axis A of the third piece relative to the first piece.

11. The vortex degassing device according to claim 8, wherein at least one annular seal is mounted between the external periphery of the lower dome and the first piece and/or between the external periphery the lower dome and the second piece.

12. The vortex degassing device according to claim 7, wherein the second deflector is integrated with the second piece and/or the first deflector is integrated with the third piece.

13. The vortex degassing device according to claim 12, wherein the third piece is in the form of an inverted funnel and comprises an upper chimney forming the second outlet and a lower dome which is mounted in the body so as to delimit the first and second chambers, the lower dome comprising a central orifice aligned on the axis A and opening into said chimney, and wherein the first deflector is connected to the lower dome and extends along the axis A from the inside to the outside of the lower dome.

14. The vortex degassing device according to claim 1, which is made of plastic material.

15. The vortex degassing device according to claim 1, wherein the second outlet has a minimum passage section S1 and the fourth outlet has a minimum passage section S2, with S1=k·S2, k being between 0.8 and 1.2.

16. A fluid transfer circuit, comprising at least one device according to claim 1.

17. The fluid transfer circuit according to claim 16, wherein the first and second chambers are connected by means of the fourth outlet to a common surge tank.

18. A method for using a vortex degassing device according to claim 1 in a fluid transfer circuit, in particular of a motor vehicle, in which a same fluid, for example a heat-transfer fluid, circulates in the first and second chambers, these fluids being at the same pressure and at different temperatures.

19. The vortex degassing device according to claim 1, wherein said second deflector extends about said second outlet.

20. The vortex degassing device according to claim 1, wherein said second outlet has an axial end which is engaged into an axial end of said fourth outlet.

21. The vortex degassing device according to claim 8, wherein said first deflector comprises an upper end directly connected to a lower surface of the lower dome.

22. The vortex degassing device according to claim 1, wherein said second deflector comprises an upper end directly connected to a lower surface of an upper portion of the second chamber.

23. The vortex degassing device according to claim 1, wherein the second outlet has a free upper end which is located above said second inlet.

* * * * *